United States Patent [19]

Hai

[11] Patent Number: 5,224,900

[45] Date of Patent: Jul. 6, 1993

[54] BOLT AND SCREW REPAIRING TOOL

[76] Inventor: Lin T. Hai, P.O. Box 82-144, Taipei, Taiwan

[21] Appl. No.: 874,803

[22] Filed: Apr. 28, 1992

[51] Int. Cl.⁵ .............................................. B23G 5/00
[52] U.S. Cl. .................................................... 470/185
[58] Field of Search ............... 470/185, 186, 187, 188, 470/189, 190, 191, 67, 80, 81, 82, 83, 84; 30/94

[56] References Cited

U.S. PATENT DOCUMENTS

| | | | |
|---|---|---|---|
| 2,016,735 | 10/1935 | Abramson et al. | 30/94 |
| 2,064,661 | 12/1936 | Hammond | 30/94 |
| 3,688,323 | 9/1972 | Bouck | 470/185 |
| 3,793,659 | 2/1974 | Edgar | 470/185 |
| 4,150,450 | 4/1979 | Laub, Jr. et al. | 470/185 |
| 5,060,330 | 10/1981 | Stahl | 470/186 |

Primary Examiner—Lowell A. Larson
Assistant Examiner—Michael J. McKeon
Attorney, Agent, or Firm—Alfred Lei

[57] ABSTRACT

A bolt and screw repairing tool comprises mainly a main body, a rotating cutting and pressing body, and a positioning cutting and pressing body. The main body comprises a handle, a protruded portion, and a recessed portion. The protruded portion is provided with a through hole and a threaded hole in communication with the through hole. The threaded hole receives a thumbscrew. The protruded portion further comprises a slot. The recessed portion is provided with a receiving hole. The rotating cutting and pressing body comprises a clamping head having a cutting and pressing plate with a triangular edge attached thereto. The rotating cutting and pressing body is received securely in the receiving hole of the recessed portion of main body by means of a shaft which can be rotated to the left and to the right for an angle of 15 degrees respectively. The positioning cutting and pressing body comprises a vertical cutting and pressing plate fastened to a long threaded rod emerging from other side of main body by passing through the through hole and engaging with adjusting wheel. The cutting and pressing bodies are used to clamp the damaged work piece (bolt) for repairing by rotating the main body to move along the paths of threaded portion of the work piece (bolt).

2 Claims, 4 Drawing Sheets

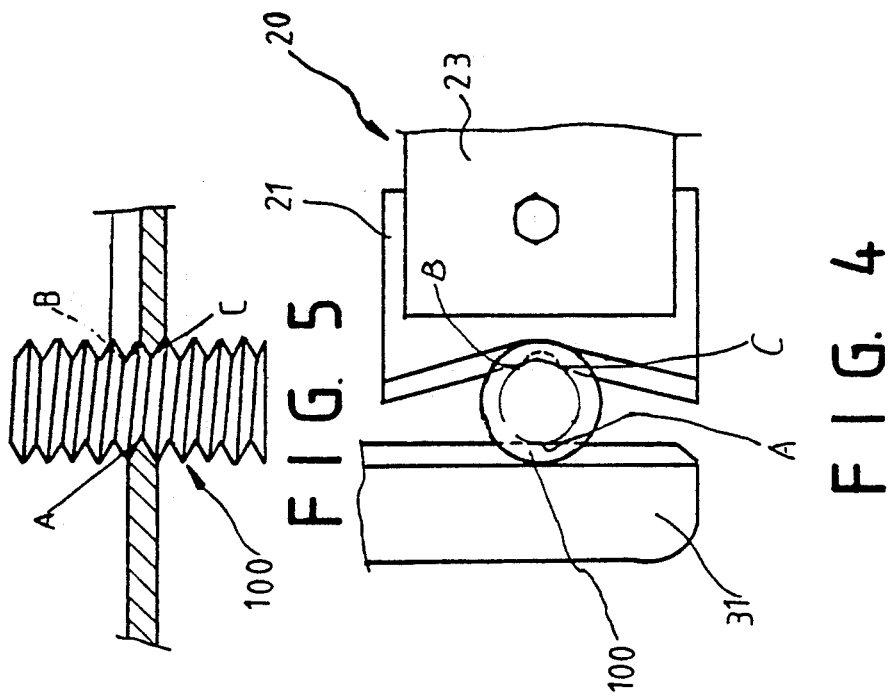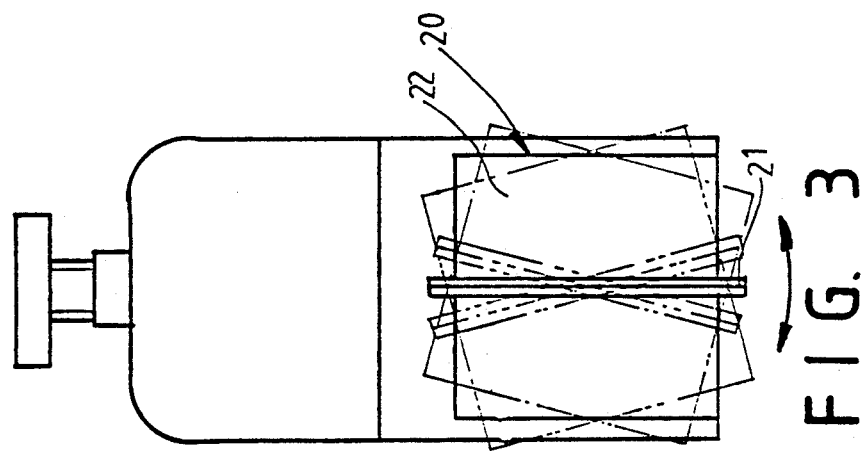

BOLT AND SCREW REPAIRING TOOL

BACKGROUND OF THE INVENTION

Bolts and screws are vulnerable to damage after a prolonged usage or under a rough usage. This is often the case with the threaded portions of bolts and screws. Of course, the damaged bolts and screws can be easily replaced with the new ones which are often readily available. However, if the damaged bolts and screws happen to be the ones with specific sizes, the replacement thereof is often a problem causing the stoppage of work in the shop. Such problem can not be easily solved, because the order of new bolts and screws may take time to fill.

The inventor of the present invention has been troubled for a long time by the problem described above and has incurred a substantial material loss as a result. This inventor was therefore determined to come out with an effective solution to the problem. After having done a series of research and testing for years, this inventor has finally and successfully invented a perfect tool for repairing bolts and screws.

SUMMARY OF THE INVENTION

The primary objective of the present invention is to provide a tool for repairing easily the threaded portions of bolts and screws which have specific sizes and have been damaged or deformed.

It is another objective of the present invention to provide a manually-operated tool of constructional ingenuity, which can be operated conveniently and easily.

The structures, features, functions, and objectives of the present invention will be better understood by studying the following detailed description of the preferred embodiment in conjunction with the drawings provided herewith.

BRIEF DESCRIPTION OF THE DRAWINGS

FIG. 3 shows a schematic view of the cutting apparatus;

FIG. 4 shows how a work piece is pressed and clamp;

FIG. 5 is a sectional front view of FIG. 4; and

DETAILED DESCRIPTION OF THE PREFERRED EMBODIMENT

Figure 1:
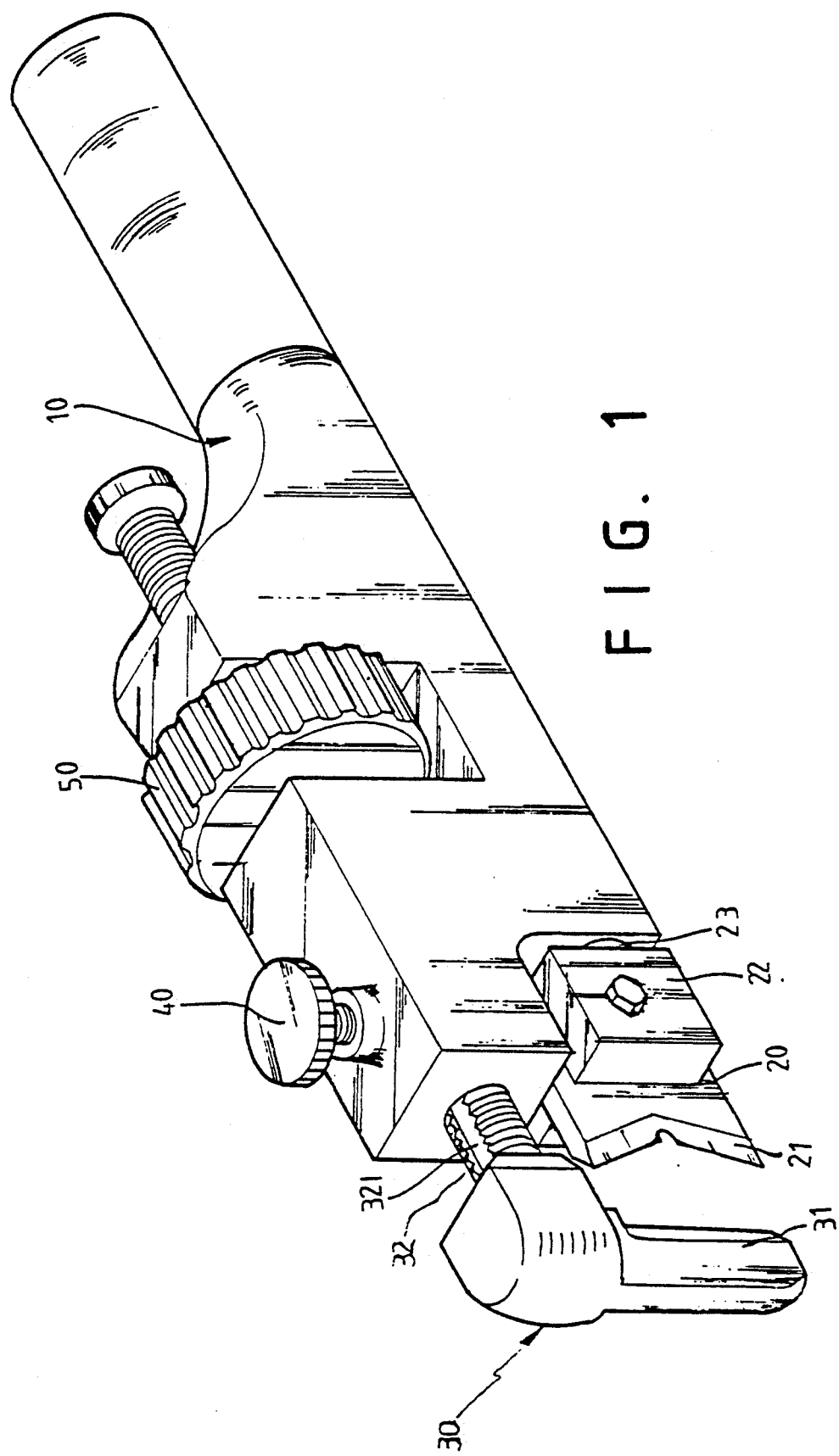
FIG. 1 shows a perspective view of the present invention.
Figure 2:
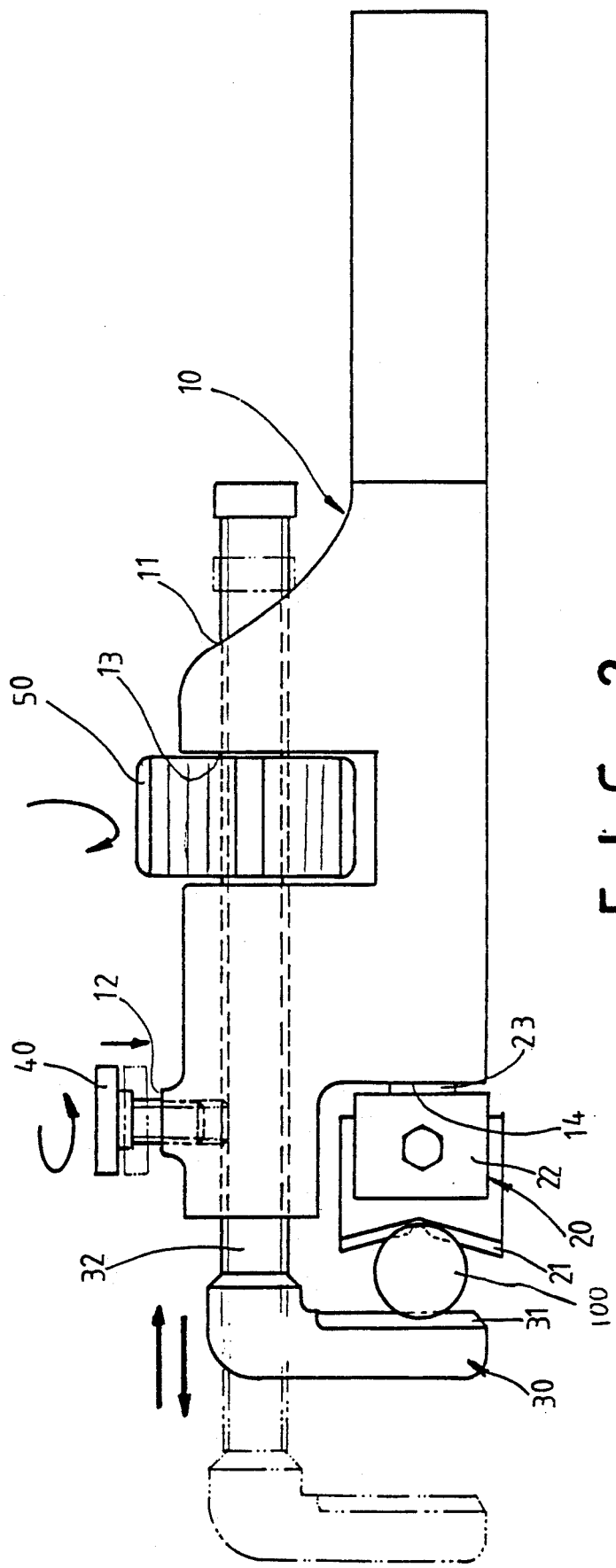
FIG. 2 shows a front view of the present invention.
Figure 6:
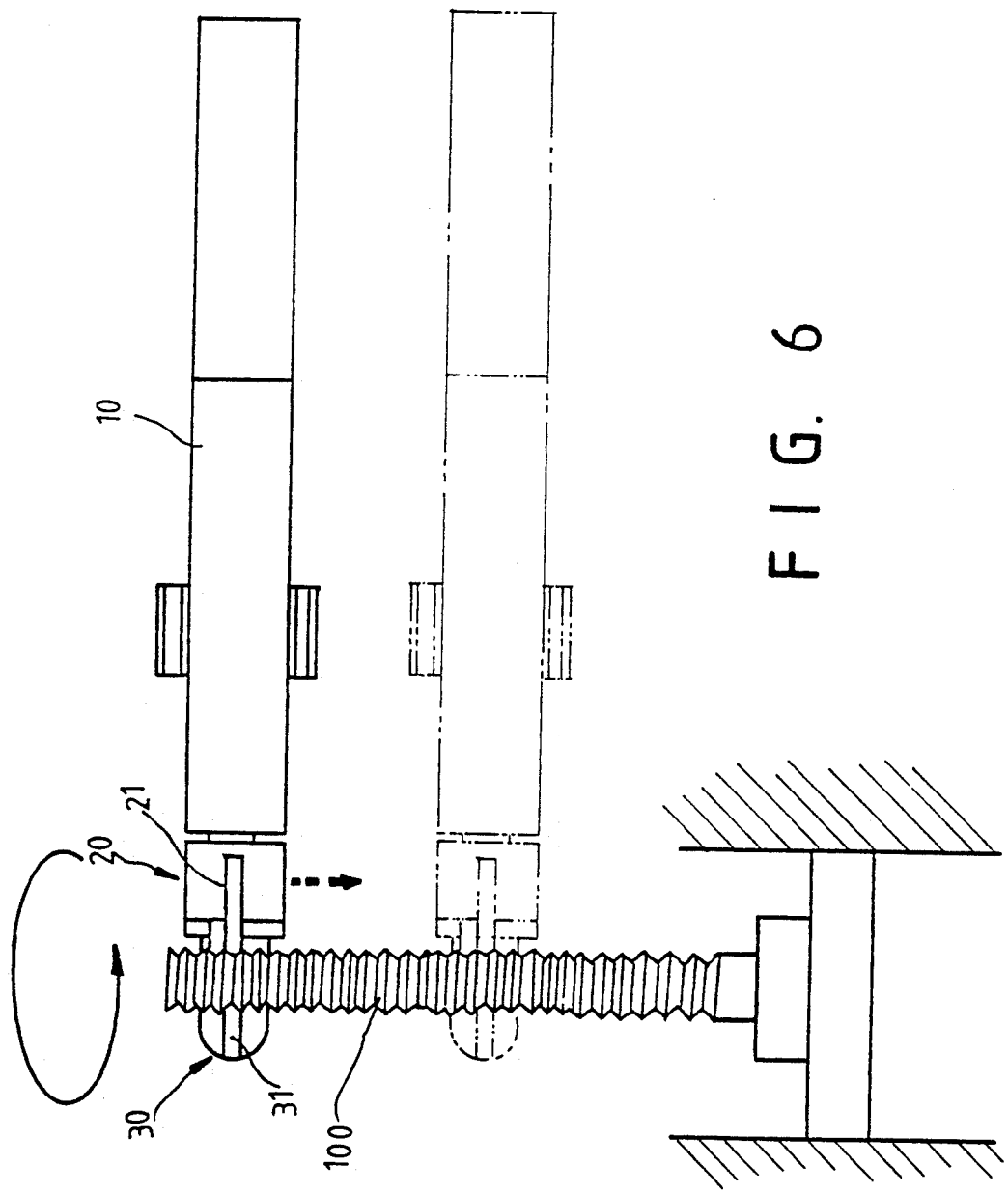
FIG. 6 shows an embodiment of the present invention.

Referring to FIGS. 1 and 2, the repairing tool embodied in the present invention comprises a main body 10 similar to that of a wrench and a pair of cutting and pressing bodies 20 and 30. The main body 10 is provided at one end thereof with a handle and at other end thereof with a recessed portion. The protruded portion is composed of a through hole 11, while the recessed portion consists of a groove 14. The main body 10 comprises at top end thereof a screw hole 12 receiving therein a thumbscrew 40. Located at an appropriate position in the mid-section of the main body 10 is a slot 13 accommodating therein an adjusting wheel 50. The cutting and pressing body 20 is provided with a clamping head 22 fastening thereto a cutting and pressing plate 21 having a triangular side. The cutting and pressing plates 21 of different sizes can be fastened interchangeably to the clamping head 22 in accordance with the work requirements. The other end of the clamping head 22 is fastened securely in the receiving hole 14 of the main body 10 by means of a shaft 23. The cutting and pressing body 30 is composed of a vertical cutting and pressing plate 31 fastened to a threaded rod 32 which emerges from the other side of the main body 10 by passing through the through hole 11 of the main body 10 and by engaging the adjusting wheel 50 received in the slot 13 of the main body 10. The threaded rod 32 is provided at the top side thereof with a strip groove 321 so that it can be positioned securely by rotating the thumbscrew 40.

Now referring to FIGS. 3 and 4, the cutting and pressing plates 21 and 31 of the cutting and pressing bodies 20 and 30 are shown holding the grooves of thread of the work piece (botl) 100. Each of the cutting and pressing plates is provided with a triangular tapered knife blade. Both cutting and pressing plates 21 and 31 can be adjusted to hold the thread grooves of the bolt 100. In order to cooperate with the thread characteristics, the cutting and pressing body 20 is designed in such a way that it can be rotated to the left and the right for an angle of 15 degrees respectively, as shown in FIG. 3. The cutting and pressing plate 31 of the cutting and pressing body 30 makes contact with the extreme left side (A) of the groove, while the cutting and pressing plate 21 of the cutting and pressing plate 20 is rotated along the bevel of the thread groove to make contact with points B and C so as to hold the bolt in a triangular manner. At this moment, the main body 10 can be rotated, by means of the handle, upwardly or downwardly along the thread paths of the bolt so as to remove the foreign objects or rust deposited in the thread grooves of the bolt 100 and to repair at the same time the damaged or the deformed thread teeth of the bolt 100 with ease and speed.

The embodiment of the present invention described above is to be considered in all respects as merely an illustration of principles of the present invention. Accordingly, the present invention is to be limited only by the scope of the hereinafter appended claims.

I claim:

1. A bolt and screw workpiece repairing tool comprising a main body, a rotating cutting and pressing body, and a positioning cutting and pressing body, said main body being provided at one end thereof a handle and at another end thereof with a protruded portion and a recessed portion, said protruded portion having a through hole and a threaded hole, said threaded hole communicating with said through hole and receiving therein a thumbscrew, said protruded portion further having a slot disposed at one side thereof, said recessed portion comprising therein a receiving hole, said rotating cutting and pressing body being provided with a clamping head having at one end thereof a cutting and pressing plate with a triangular edge and at another end thereof a shaft received in said receiving hole of said recessed portion in such a manner that said shaft is rotatable in said receiving hole both clockwise and counterclockwise, said positioning cutting and pressing body comprising a vertical cutting and pressing plate fastened to a long threaded rod emerging from another side of said main body by passing through said through hole and by engaging an adjusting wheel received in a slot, said cutting and pressing plates thereof for repairing a damaged and deformed thread teeth of said work piece (bolt) by rotating said main body to move along paths of a threaded portion of said work piece (bolt).

2. The bolt and screw repairing tool as claimed in claim 1, wherein said positioning cutting and pressing body comprises a threaded rod having thereon a long strip groove for engaging with said thumbscrew so as to position securely said threaded rod.

* * * * *